(12) United States Patent
Fujita et al.

(10) Patent No.: US 6,321,140 B1
(45) Date of Patent: Nov. 20, 2001

(54) ROBOT DEVICE

(75) Inventors: Masahiro Fujita; Kazufumi Oyama, both of Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/215,702

(22) Filed: Dec. 18, 1998

(30) Foreign Application Priority Data

Dec. 22, 1997 (JP) .................................... 9-353935

(51) Int. Cl.⁷ .................................... G05B 19/418
(52) U.S. Cl. .................... 700/248; 700/245; 700/249; 700/251; 700/259; 700/262; 700/263; 360/92; 250/253; 463/44; 318/568.15; 318/568.17; 318/573; 901/22
(58) Field of Search .................... 700/248, 245, 700/249, 259, 263, 251, 262; 360/92; 250/253; 463/44; 318/568.15, 568.17, 573; 901/22

(56) References Cited

U.S. PATENT DOCUMENTS

| 3,891,264 | 6/1975 | Hunter, II et al. | |
|---|---|---|---|
| 4,467,436 | * 8/1984 | Chance et al. | 700/249 |
| 4,954,952 | 9/1990 | Ubhayakar et al. | |
| 4,990,839 | * 2/1991 | Schonlau | 700/248 |
| 5,145,130 | 9/1992 | Purves. | |
| 5,890,964 | * 3/1999 | Aoki et al. | 463/44 |

OTHER PUBLICATIONS

Yamasaki et al., A Functionally Distributed Responsive Micro Controller For Distributed Real–Time Processin, IEEE., pp. 793–798, Aug. 1997.*
Fallside et al, Computer Vision For Robotics Using A Transputer Array, IEEE., pp. 6/1–6/4, Sep. 1989.*
Mali et al., Metrics for evaluation of behavior–based robotic systems, 1998, IEEE, pp. 1122–1127.*
Patent Abstracts of Japan JP 09272086 A (Tokai Rubber Ind) Oct. 21, 1997.

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Dennis M. Smid (57) ABSTRACT

A robot device having a plurality of component units connected together and controller detachably mounted on one of the component units for driving and controlling each the component units in a prescribed state. The control device is easily exchangeable for another control device. The robot device may further include a storing device detachably mounted on the respective component unit for storing desired behavior type information. The storing device is readily exchangeable for another storing device having stored therein different behavior type information.

19 Claims, 10 Drawing Sheets

ROBOT DEVICE

BACKGROUND OF THE INVENTION

1. Field of the Invention

This invention relates to a robot device and more particularly, is suitably applied to an autonomous moving type robot.

2. Description of the Related Art

Figure 1A:
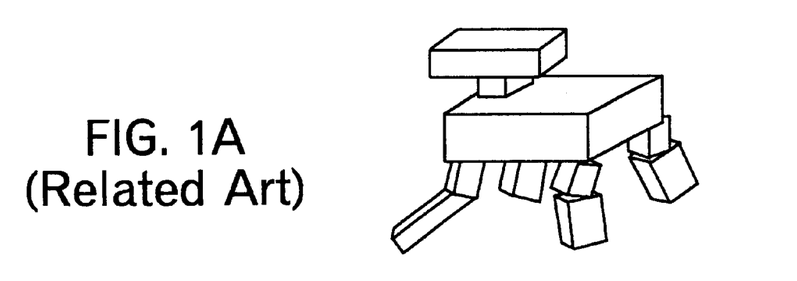
FIGS. 1A to 1D are diagrammatic perspective views explaining configurations of various robots.
Figure 1B:
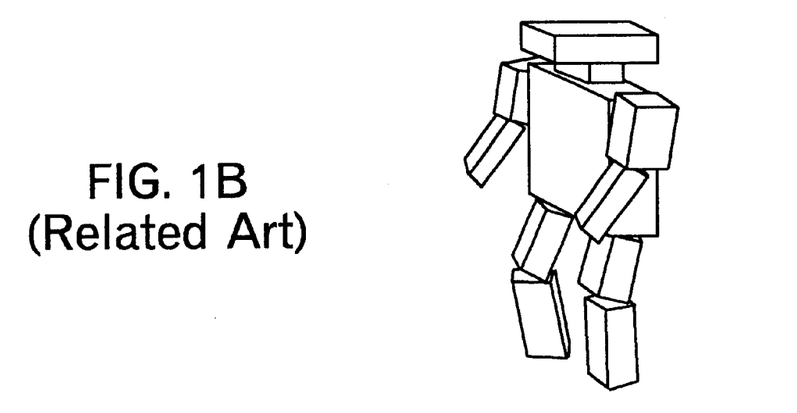
Figure 1C:
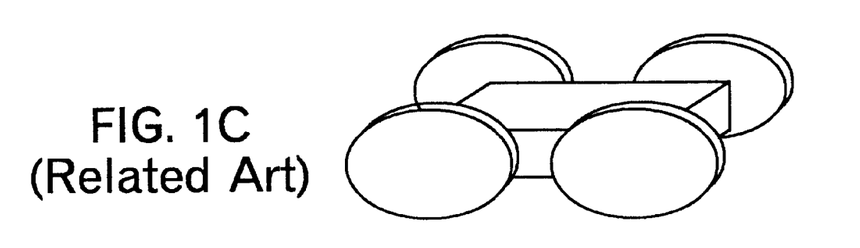
Figure 1D:
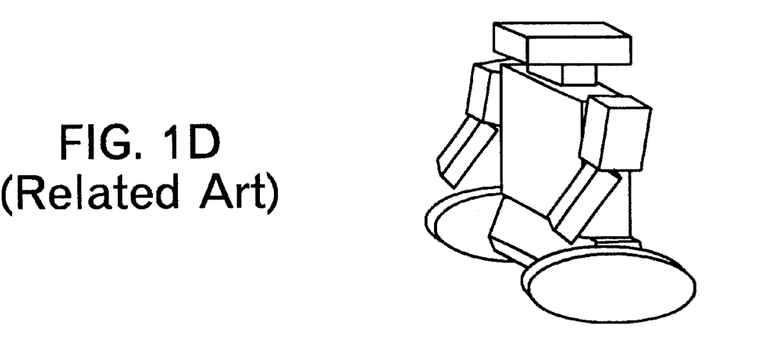

As this type of robots, a variety of robots have been known such as a four-foot walking type as illustrated in FIG. 1A, a two-foot walking type as illustrated in FIG. 1B, a vehicle type as illustrated in FIG. 1C and a two-wheel driving type as illustrated in FIG. 1D.

Ordinarily, these kinds of robots operate in accordance with their configurations by executing an operation program corresponding to the configurations, such as the two-foot walking type or the four-foot walking type, by a general purpose computer accomodated in a body unit or a central processing unit (CPU) mounted on a CPU board.

Recently, as one of these type of robots, component units, such as a body unit and a head unit, for forming the robot are connected together using serial buses and thereby, the CPU detects the connecting mechanisms of these component units in order to automatically decide the configuration of the robot based on the detection result.

Further, one of this type of robots divides an operation program into a host program (hereinafter, referred to as a host operation program) for supplying a general operation instruction such as "move forward", "move backward", etc. which does not depend on the configuration of the robot and a subordinate program (hereinafter, referred to as a subordinate operation program) for driving and controlling the component units to respective states depending on the configuration of the robot in order to actually move the robot in accordance with the above instruction. Thus, the host operation program, which does not depend on the configuration of the robot, can be utilized commonly between different robots.

In addition to this, the component units of the robot are detachably connected together using serial buses, a CPU classifies the configuration of the robot and it is decided based on the classification result how operation program is selected, that is to say, what purpose (for instance, right foot or left foot) the component units are operated for. Accordingly, even when the configuration of the robot is changed by changing the connecting mechanism of the component units, an operation program corresponding to the configuration can be automatically selected and executed.

However, while detachably connecting the component units using the serial buses can give freedom to the design of the robot, a robot which is monolithically designed in advance so as not to be changed its configuration, can give more freedom to its design or can be more inexpensively manufactured. In this connection, monolithically designing a robot in such a manner can be regarded as a special case of methods for detachably connecting the component units and can ensure the generalization of the host operation program.

For this type of the robots, a method has been considered in which a CPU board is detachably mounted in a body unit using a parallel bus such as a Versa Module Europe (VME) bus or a peripheral component interconnect (PCI) bus. This method has an advantage in that performance of the CPU is improved twice as high as the previous year every year and the CPU board can be exchanged for a CPU board loaded with a CPU whose performance is improved.

However, according to the aforementioned method, since an operation program (a subordinate operation program in the case of a hierarchical structure) is written in a memory provided on the CPU board, it is necessary to download the aforementioned operation program (or a subordinate operation program) to a memory of a new CPU board using a host computer to which the CPU board can make access, every time when exchanging the CPU board. Therefore, the exchanging operation of the CPU board has been troublesome, so that the CPU board can not readily be exchanged for a new CPU board.

SUMMARY OF THE INVENTION

In view of the foregoing, an object of this invention is to provide a robot device in which its functions and performance can be improved with ease.

The foregoing object and other objects of the invention have been achieved by the provision of a robot device constructed by connecting plural component units together, which comprises control means which is detachably mounted on a prescribed component unit and used for driving and controlling each of the component unit in a prescribed state.

As a result, the control means can be easily exchanged.

Further, according to the present invention, a robot device which is constructed by connecting plural component units together, comprises storing means which is detachably mounted on a prescribed component unit and used for storing desired behavior type information.

Consequently, the storing means can be readily exchanged for storing means in which different behavior type information is stored.

Furthermore, according to the present invention, a robot device constructed by connecting plural component units together comprises first storing means for storing configuration information which represents a configuration of the robot device constructed by connecting the component units together with unit information inherent in each component unit; second storing means for storing a prescribed operation program; and control means for reading out the configuration information and the operation program from the first and the second storing means respectively, changing the read configuration information in accordance with additional component units connected to respective component units, and driving and controlling each of the component units and additional component units in a prescribed state on the basis of the changed configuration information and operation program.

As a consequence, even when changing the configuration of the robot, the configuration information and the operation program do not need to be rewritten and the control means can be used as it is without changing in order to drive and control each of the component units in a prescribed state. Thus, the configuration of the robot can be changed with ease.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment
(1-1) Configuration of Robot according to First Embodiment

Figure 2:
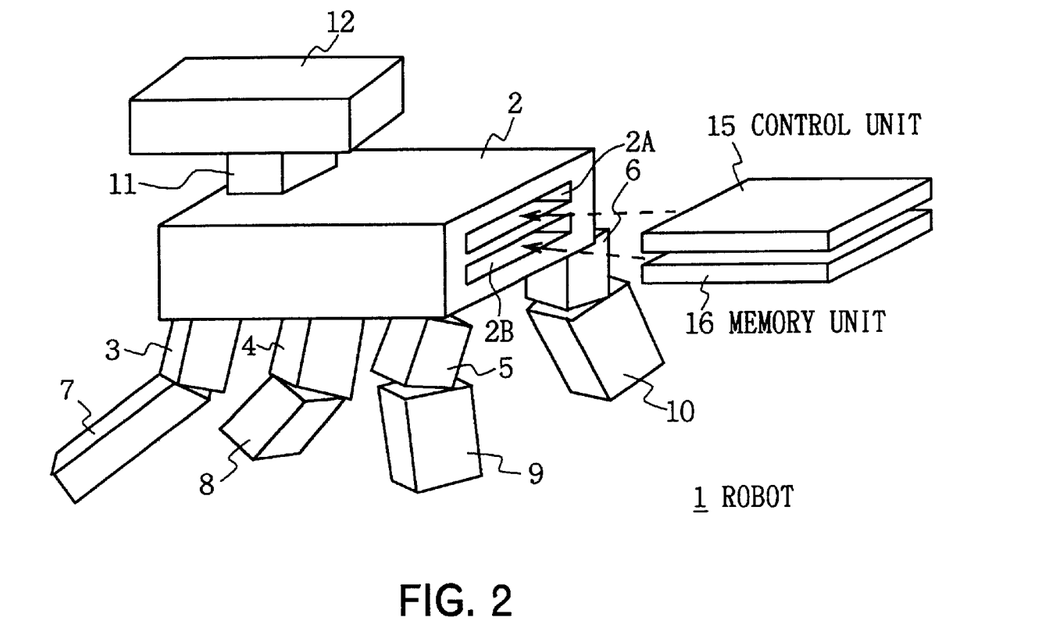
FIG. 2 is a diagrammatic perspective view showing a configuration of a robot in a first embodiment according to the present invention.

In FIG. 2, 1 designates a robot according to a first embodiment as a whole, which is monolithically constructed; thigh units 3 to 6 and leg units 7 to 10 are successively connected to the front, rear, right and left corner parts below a body unit 2 respectively, and a neck unit 11 and a head unit 12 are successively connected to the central part of a front end part of the upper surface of the body unit 2. In the following description, the body unit 2, the thigh units 3 to 6, the leg units 7 to 10, the neck unit 11 and the head unit 12 are called component units 2 to 12 collectively.

Further, first and second slots 2A and 2B are provided on the side surface of the rear end side of the body unit 2. A control unit 15 composed of a personal computer (PC) card is detachably mounted in the first slot 2A and a memory unit 16 composed of a PC card is detachably mounted in the second slot 2B.

Figure 3:
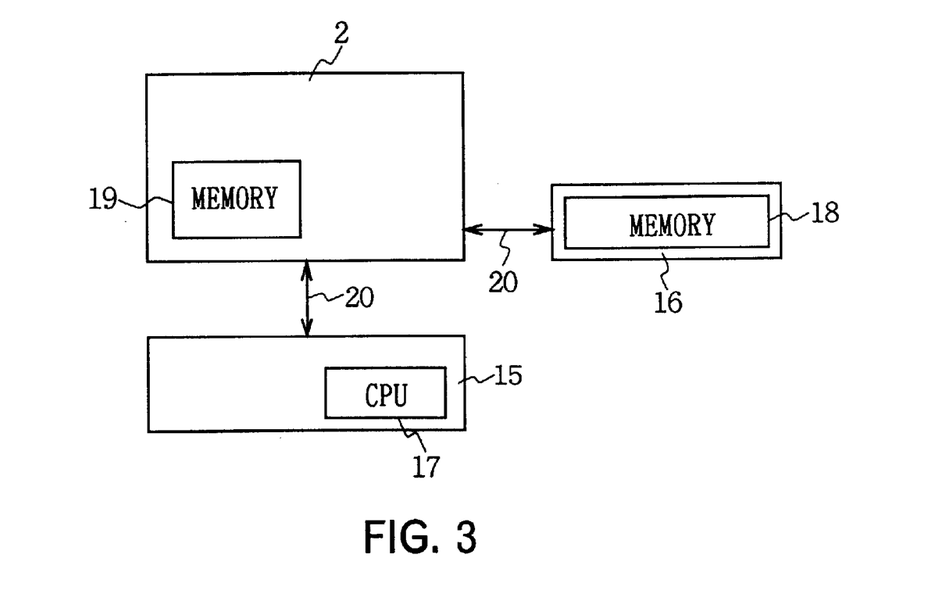
FIG. 3 is a block diagram explaining the connection between a control unit, a memory unit and a body unit.
Figure 4:
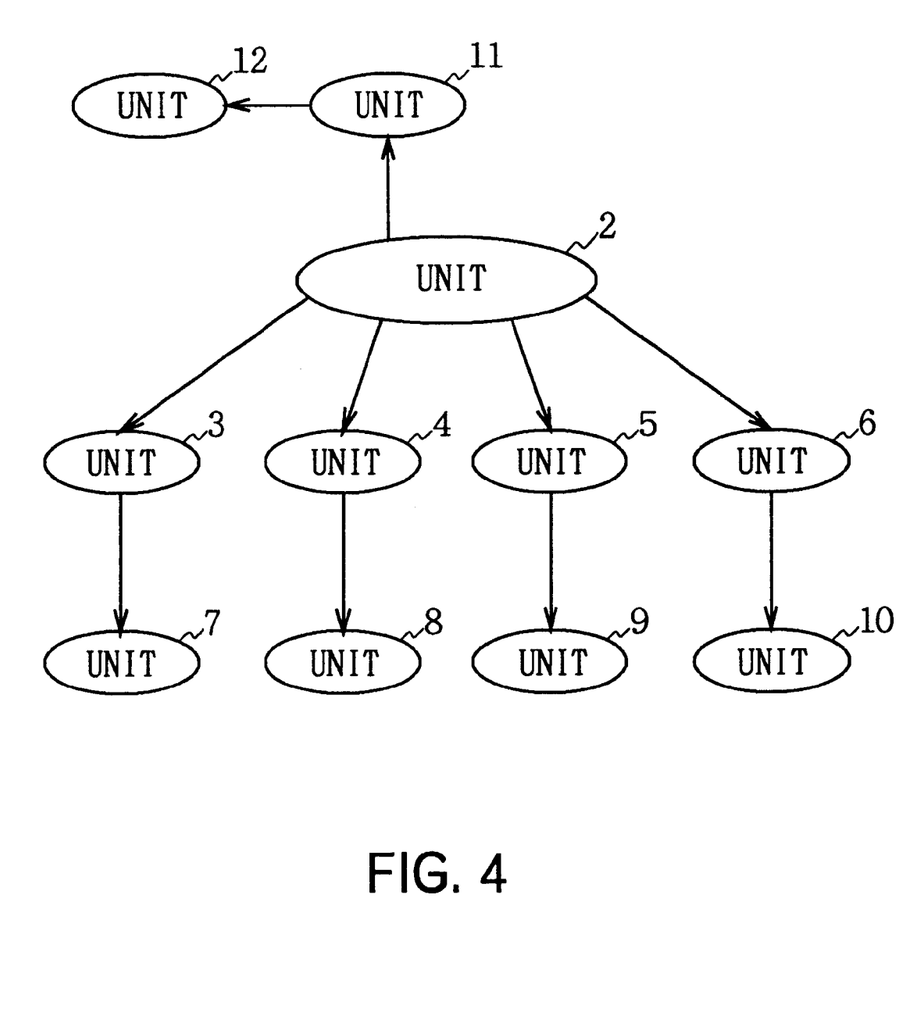
FIG. 4 is a conceptual view showing a tree structure for representing configuration information.

In this case, as shown in FIG. 3, a CPU 17 or the like for controlling the action of the robot 1 is accommodated in the control unit 15. Besides, a nonvolatile memory (hereinafter, referred to as a memory) 18, such as a mask read only memory (ROM) or a flash ROM. is accommodated in the memory unit 16. In, the memory 18, information (hereinafter, referred to as behavior type information) on what type of behavior, such as for a pet, dancing or a combat, the robot 1 performs for is previously stored as an application program.

Further, the body unit 2 contains a memory 19 such as a flash ROM. In the memory 19, an operation program (hereinafter, referred to as a basic operation program) and a configuration program are previously stored: the basic operation program for making the robot 1 perform a basic action, which is composed of al hierarchical structure comprising a host operation program and a program (hereinafter, referred to as an intermediate operation program) being a part of a subordinate operation program to supply an action instruction, such as "stand up" and "sit down", depending on an operation instruction supplied from the host operation program; and the configuration information for representing various kinds of information (hereinafter, referred to as unit information collectively), such as a role ("head", "neck", etc.), a formation and a position of the center of gravity, for each of the component units 2 to 12 with a tree structure showing the connecting condition of the component units 2 to 12, as shown in FIG. 3, in accordance with the configuration of the robot 1 (for example, a four-foot walking type).

In the robot 1, when the control unit 15 or the memory unit 16 is mounted in the first slot 2A or the second slot 2B of the body unit 2 and they are held in the body unit 2, the memories 19 and 18 of the body unit 2 and the memory unit 16 are electrically connected to the CPU 17 of the control unit 15 through a card bus 20.

Thus, when the control unit 15 and the memory unit 16 are held in the body unit 2, the CPU 17 reads the configuration information and the basic operation program from the memory 19 of the body unit 2 and the application program from the memory 18 of the memory unit 16 so as to make the robot 1 drive according to its configuration and behavior types based on the read configuration information, the basic operation program and the application program.

Figure 5:
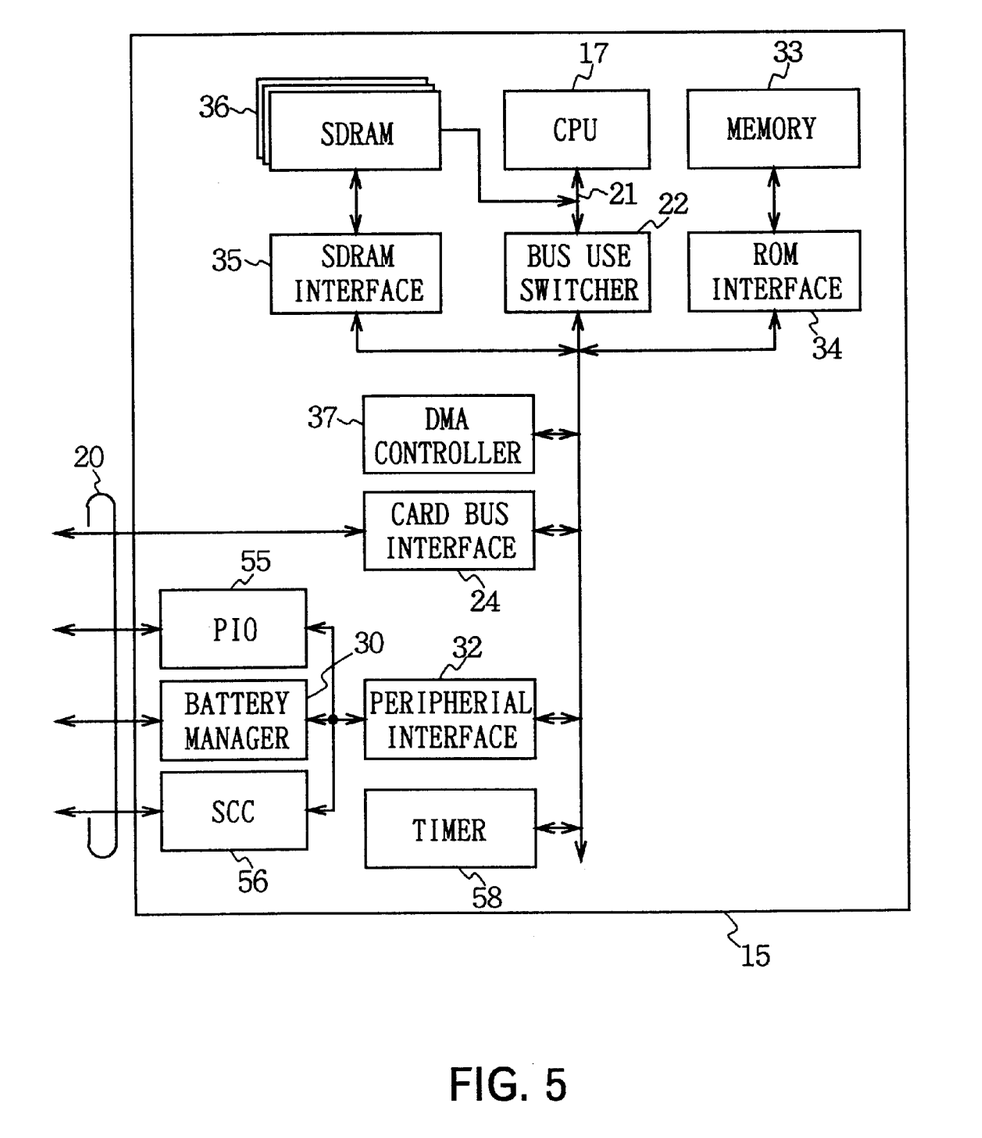
FIG. 5 is a block diagram showing the circuit of the control unit.
Figure 6:
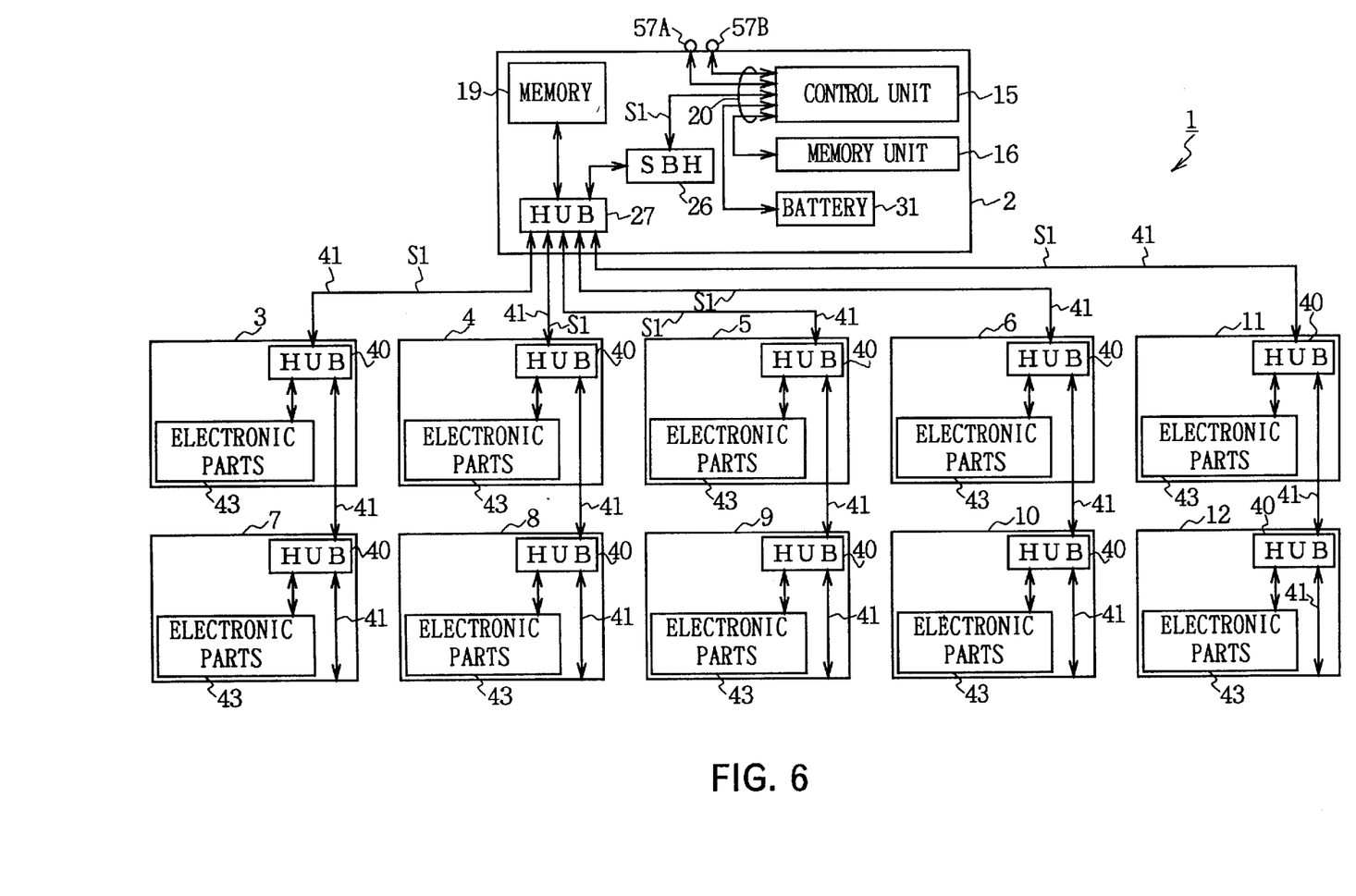
FIG. 6 is a block diagram showing the circuit of the robot.

Here, as shown in FIGS. 5 and 6 in practice, in the robot 1, when the control unit 15 is mounted in the first slot 2A of the body unit 2 and the memory unit 16 is mounted in the second slot 2B, an serial bus host (SBH) 26 for controlling a serial bus in the body unit 2 and the memory 18 in the memory unit 16 are electrically connected to the CPU 17 of the control unit 15 via a first CPU bus 21, a bus use switcher 22, a second CPU bus 23, a card bus interface 24 and a card bus 20 sequentially. In this connection, the memory 19 is electrically connected to the SBH 26 via a HUB (distributor) 27 in the body unit 2.

At this time, a battery 31 in the body unit 2 is electrically connected to a battery manager 30 of the control unit 15 through the card bus 20. The CPU 17, when power is supplied from the battery 31 successively through the card bus 20, the battery manager 30, a peripheral interface 32, the second CPU bus 23, the bus use switcher 22 and the first CPU bus 21, reads out an operating system (OS) previously stored in a memory 33 such as a flash ROM therefrom and downloads the read out operating system to a SDRAM 36 successively through a ROM interface 34, the second CPU bus 23 and a SD-random access memory (SDRAM) interface 35 and reads the operation system from the SDRAM 36 through the first CPU bus 21 to start.

Further, the CPU 17 reads out the configuration information from the memory 19 via the HUB 27 and the SBH 26 in the body unit 2 and then, downloads the read configuration information to the SDRAM 36 via the HUB 27, the SBH 26, the card bus 20, the card bus interface 24, the second CPU bus 23 and the SDRAM interface 35 successively.

Then, the CPU 17 reads out the configuration information from the SDRAM 36 via the first CPU bus 21 to recognize the configuration of the robot 1 based on the read configuration information.

Further, the bus use switcher 22 gives the using right for the second CPU bus 23 to a direct memory access (DMA) controller 37 under the control of the CPU 17, so that the DMA controller 37 reads out the application program from the memory 18 in the memory unit 16 under the control of the CPU 17 and downloads the read application program to the SDRAM 36 via the card bus 20, the card bus interface 24, the second CPU bus 23 and the SDRAM interface 35 successively.

Then, the CPU 17 reads out the application program from the SDRAM 36 through the first CPU bus 21 to recognize the behavior type of the robot 1 based on the read application program.

Under this state, the CPU 17 reads out the basic operation program from the memory 19 in the body unit 2 through a route similar to the aforementioned case of reading the configuration information, downloads the read basic operation program to the SDRAM 36 and then, reads out the basic operation program from the SDRAM 36 through the first CPU bus 21 to start it.

Accordingly, the CPU 17, when receiving a prescribed instruction such as "move forward" from the host operation program of the basic operation program, generates control signals S1 corresponding to various kinds of instructions, such as "raise a right leg", which are necessary for the respective component units 3 to 12 except for the body unit 2 in order to move the robot 1 forward based on the intermediate operation program of the basic operation program and the configuration information, and supplies these control signals S1 to the HUB 27 via the SBH 26 in the body unit 2.

In this case, HUBs 40 accommodated in the respective thigh parts 3 to 6 and the neck part 11 are electrically connected to the HUB 27 of the body unit 2 through serial buses 41 and moreover, HUBs 40 housed in the respective log units 7 to 10 and the head unit 12 are electrically connected to the HUBs 40 in the thigh units 3 to 6 and the neck unit 11 through serial buses 41, respectively.

Further, electronic parts 43 required for operations of an actuator and a sensor or the like are accommodated respectively in the thigh units 3 to 6, the leg units 7 to 10, the neck unit 11 and the head unit 12.

Thus, the control signals S1 supplied to the HUB 27 of the body unit 2 are supplied from the HUB 27 to the corresponding electronic parts 43 through the respective HUBs of the thigh units 3 to 6, the leg units 7 to 10, the neck unit 11 and the head unit 12.

In such a way, the CPU 17 controls and drives the electronic parts 43 in the thigh units 3 to 6, the leg units 7 to 10, the neck unit 11 and the head unit 12 based on the corresponding control signals S1. Thus, each of the thigh units 3 to 6, the log units 7 to 10, the neck unit 11 and the head unit 12 can perform required actions, for example, for moving the robot 1 forward.

In this connection, when the control unit 15 is mounted in the first slot 2A of the body unit 2, a parallel input/output (PIO) 55 or a serial communication control (SCC) 56 connected to the second CPU bus 23 through the peripheral interface 32 is electrically connected to corresponding external terminal 57A or 57B provided in the body unit 2 through the card bus 20.

Accordingly, the robot 1 can execute a debugging process in the control unit 15, for example, using a personal computer (not shown) which can be connected to the external terminal 57A or the 57B, through the parallel input/output 55 or the serial communication control 56.

Besides, the control unit 15 is provided with a timer 58 connected to the second CPU bus 23. For instance, the timer 58 is used when an interactive operation is necessary for operation of the CPU 17.

(1-2) Operation and Effects According to the First Embodiment

In the robot 1 with the aforementioned construction, the control unit 15 and the memory unit 16 are mounted in the first and second slot 2A and 2B of the body unit 2 respectively, so that the CPU 17 of the control unit 15 reads out the application program from the memory 18 of the memory unit 16 and also reads out the configuration information and the basic operation program from the memory 19 in the body unit 2.

In this robot 1, the CPU 17 recognizes the configuration of the robot 1 based on the configuration information as well as the behavior type of the robot 1 based on the application program. Under this state, the CPU 17 drives and controls the electronic parts 43 of the respective component units 3 to 12 based on the basic operation program and the configuration information, in order to perform operations corresponding to instructions supplied from the host program of the basic operation program.

In this case, in the robot 1, the basic operation program is stored in the memory 19 in the body unit 2 and only the operation system is stored in the memory 33 in the control unit 15 which is detachably attached to the body unit 2. Therefore, even when the control unit 15 is exchanged for a new one, the basic operation program does not need to be downloaded to a memory 33 in a new control unit 15.

Accordingly, in the robot 1, the existing control unit 15 can be exchanged for a control unit in which a CPU whose performance is improved is accommodated.

Further, since only the operation system is stored in the memory 33 of the control unit 15 as stated above, the control unit 15 can be used for other robots. Therefore, the general purpose of the control unit 15 can be improved.

In addition, the robot 1 can drive and control the component units 3 to 12 except for the body unit 2 in the respective prescribed states based on the configuration information and the intermediate operation program, so that the structure of the basic operation program can be more simplified than that of the operation program having a hierarchical structure comprising the host operation program and the subordinate operation program.

Further, according to the robot 1, the memory unit 16 can be readily exchanged for a new one similarly to the control unit 15. In other words, the robot 1 can perform an action of different kind of behavior type only by mounting a memory unit 16 having different kind of behavior type information in the second slot 2B of the body unit 2

With the aforementioned construction, the configuration information and the basic operation program are stored in the memory 19 of the body unit 2 and the configuration information and the basic operation program are read out from the CPU 17 of the control unit 15, which is detachably mounted in the first slot 2A of the body unit 2, at the time of operation of the robot 1. Thereby, the control unit 15 can be readily exchanged for a new control unit in which a CPU whose performance is improved is accommodated and thus, the robot capable of simply improving its performance and functions can be realized.

Furthermore, the memory unit 16 is also detachably mounted and held in the second slot 2B of the body unit 2 similarly to the body unit 15, so that the memory unit 16 can be readily exchanged for a memory unit 16 which contains a memory 18 storing behavior type information different from that of stored in the memory 18 of the former memory unit 16. Accordingly, a robot capable of simply improving its functions and performance can be realized.

Figure 7:
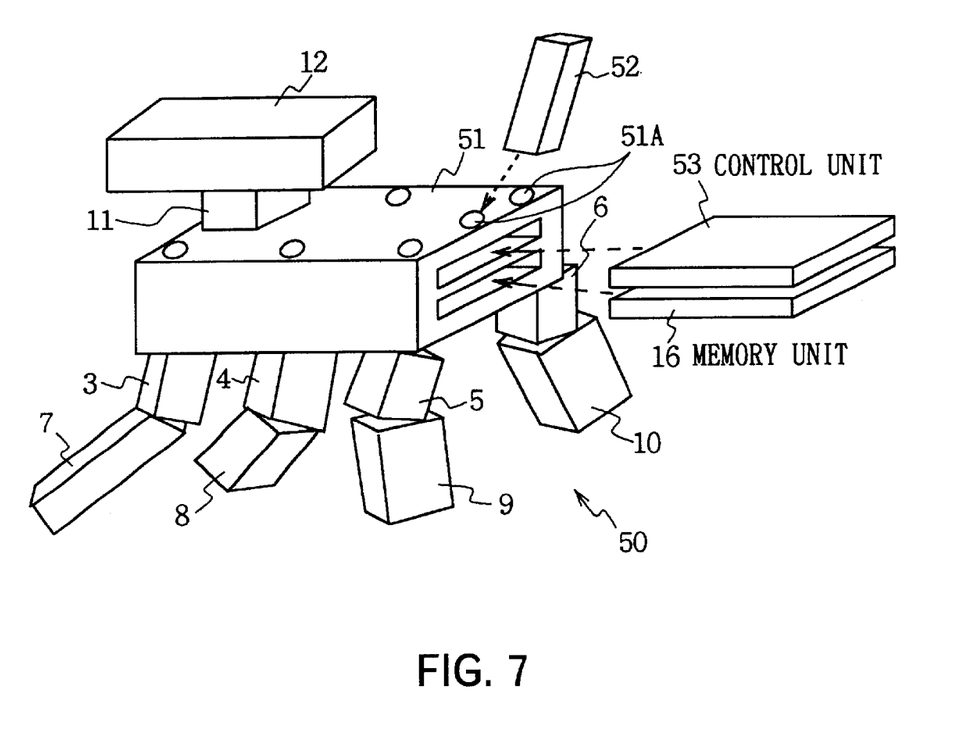
FIG. 7 is a diagrammatic perspective view showing a configuration of a robot in a second embodiment according to the present invention.

(2) Second Embodiment (2-1) Configuration of Robot According to Second Embodiment FIG. 7 in which the same reference numerals are applied to parts corresponding to FIG. 2 shows a robot 50 according to a second embodiment. The robot 50 is constructed substantially similarly to the robot 1 according to the first embodiment except that prescribed component units (hereinafter, referred to as additional component units) 52, such as a tail unit, are newly and detachably connected to connection parts 51A provided at plural prescribed positions of a body unit 51 in addition to the component units 3 to 12 except for the body unit 51 and that configuration information is changed by a control unit 53 in accordance with the connections of the additional component units 52.

Figure 8:
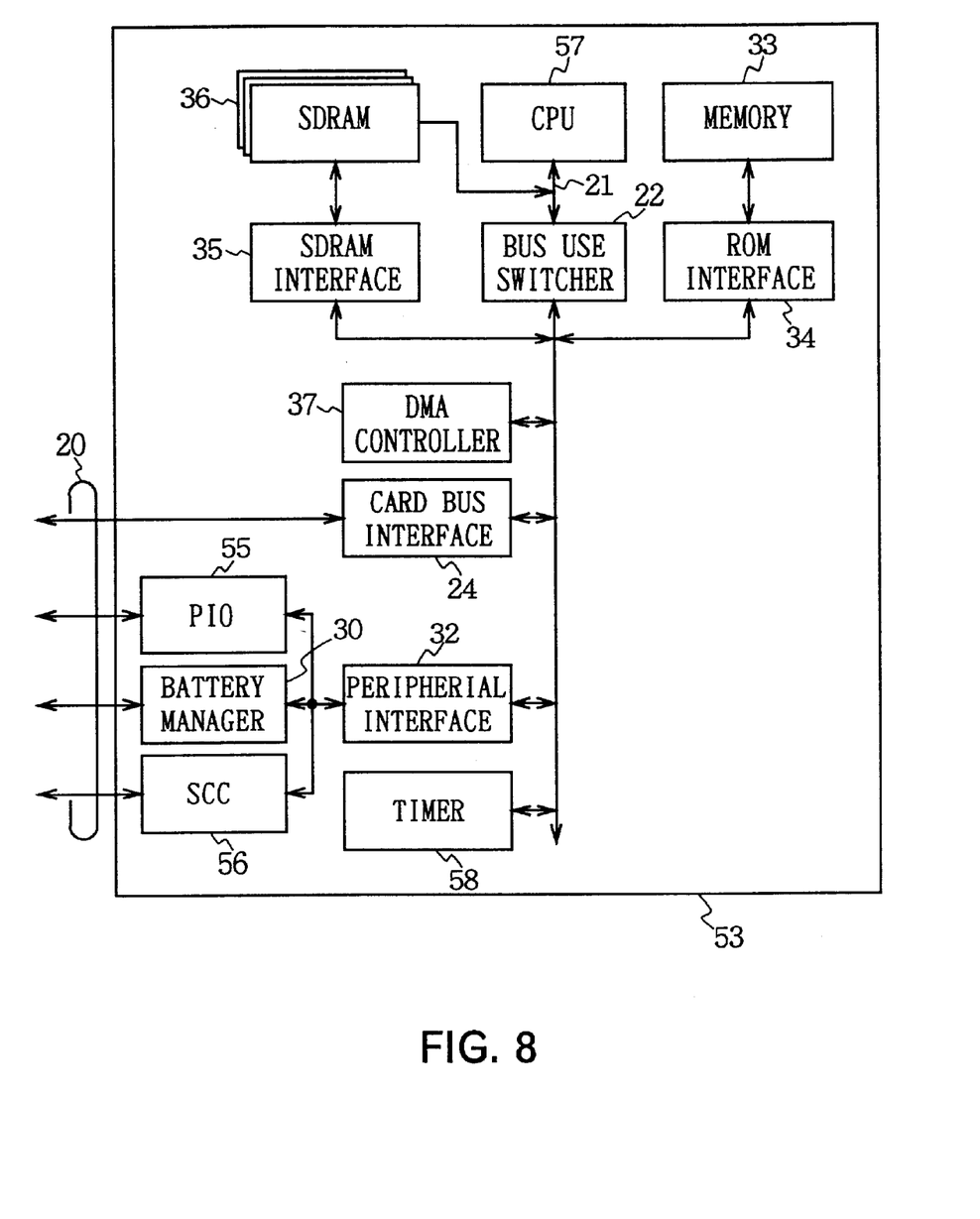
FIG. 8 is a block diagram showing the circuit of a control unit.
Figure 9:
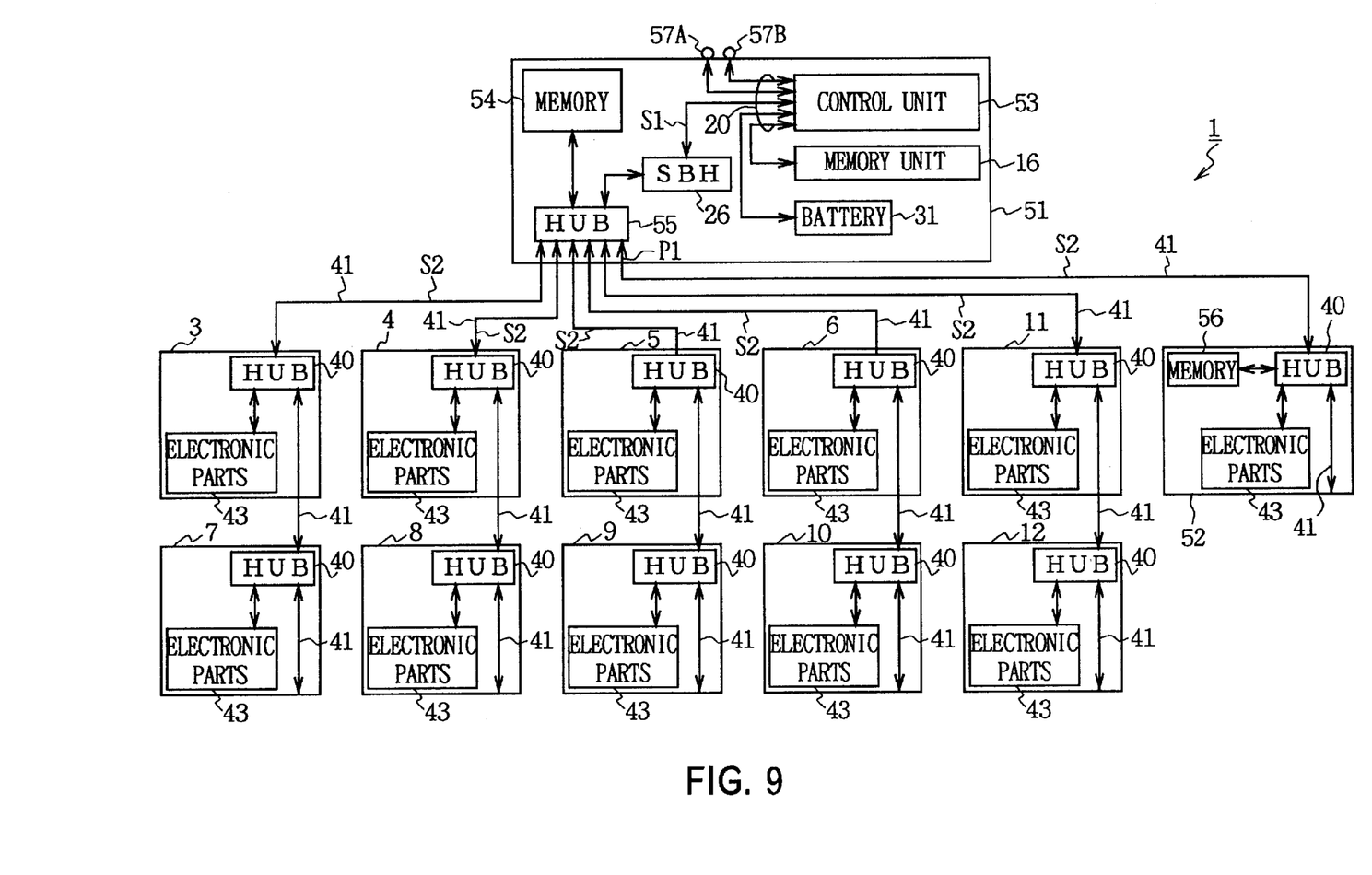
FIG. 9 is a block diagram showing the circuit of the robot.

In FIGS. 8 and 9 in which the same reference numerals are applied to parts corresponding to FIGS. 5 and 6, the body unit 51 has a memory 54 in which the positional information of a connection point P1 corresponding to each connection part 51A of an HUB 55 is stored in addition to the basic operation program and the configuration information (indicating the configuration of the robot 50 before connecting the additional component units 52) and a connector (not shown) connected to the HUB 55 through a serial bus 41 provided in each of the connection parts 51A.

Each additional component unit 52 contains an HUB 40 and electronic parts 43 similarly to the component units 3 to 12 except for the body unit 51 and has a connector (not shown) connected to the HUB 40 with a serial bus 41. The additional component unit 52 is physically connected to the corresponding connection part 51A of the body unit 51, so that the HUB 40 can be electrically connected to the HUB 55 of the body unit 51 with the serial bus 41.

Further, the additional component unit 52 contains a nonvolatile memory 56, such as a mask ROM or a flash ROM, storing unit information corresponding to the additional component unit 52.

The robot 50, when the control unit 53 is mounted in the first slot of the body unit 51 to start the CPU 57 of the control unit 53 and an operation system read out from a memory 33, reads out the configuration information and the positional information from a memory 54 in the body unit 51 to download them to an SDRAM 36, and reads out the unit information stored in the memory 56 of the additional component unit 52 via an SBH 26, an HUB 55 and a serial bus 41 of the body unit 51 and the HUB 40 of the additional component unit 52 successively to download it to the SDRAM 36.

Figure 10:
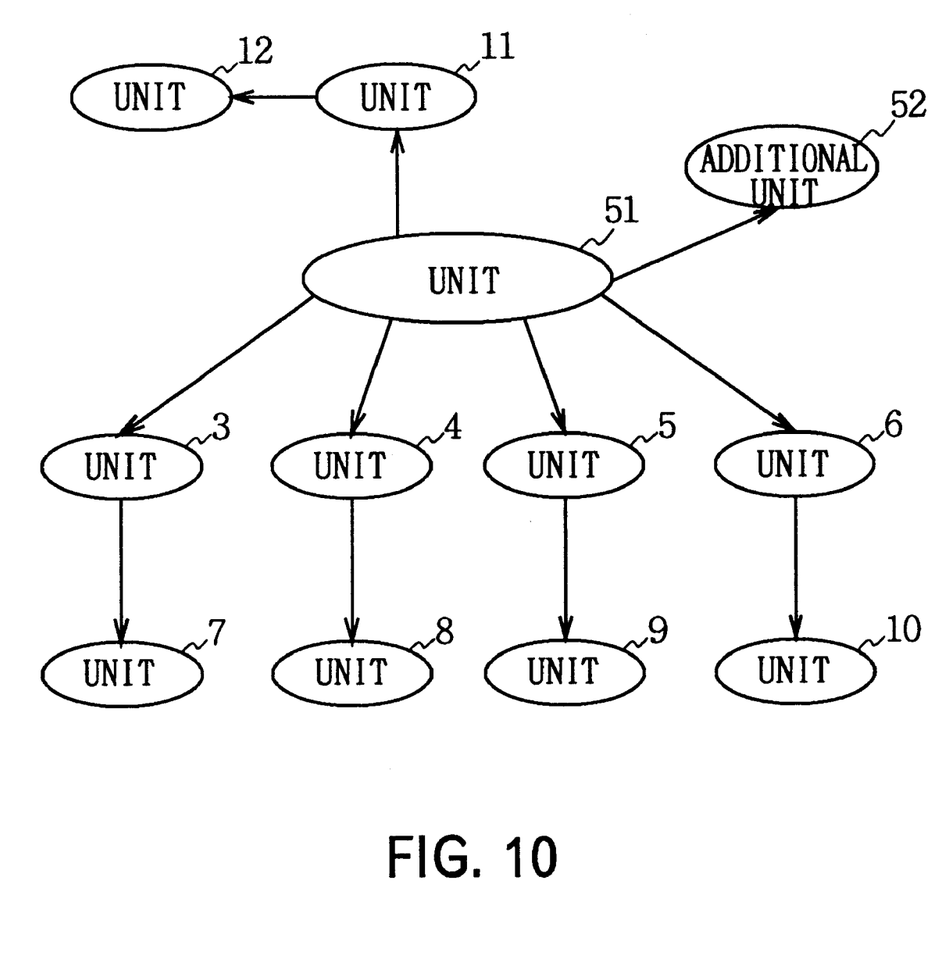
FIG. 10 is a conceptual view showing a tree structure for representing information on configuration changed by connecting an additional component unit.

Then, the CPU 57, as illustrated in FIG. 10, reads out the downloaded configuration formation, positional information and unit information from the SDRAM 36 and changes a tree structure according to the configuration of the robot 50 before connecting the additional component units 52 to the body unit 51 to a tree structure according to the configuration of the robot 50 after connecting the additional component units 52 to the body unit 51, based on these read configuration information, positional information and unit information, in order to change the configuration information.

Thus, the CPU 57 can recognize as to which additional component unit 52 is connected to which connection part 51A of the body unit 51 and as to how the configuration of the robot 50 is resultantly changed, based on thus changed configuration information (hereinafter, referred to as changed configuration information).

Further, once the CPU 57 downloads the changed configuration information to the SDRAM 36 and also downloads the basic operation program to the SDRAM 36 by reading out it from the memory 54 in the body unit 51.

Then, the CPU 57 reads out the changed configuration information from the SDRAM 36 and also reads out the basic operation program to start it. Thus, the CPU 57, when receiving a prescribed instruction, such as "move forward", from the host operation program of the basic operation program, the CPU 57 generates control signals S2 according to various kinds of instructions, such as "raise a right leg", which are necessary for the respective component units 3 to 12 except for the body unit 51 and the additional component units 52 in order to move the robot 50 forward, based on the intermediate operation program of the basic operation program and the changed configuration information and supplies these control signals S2 to the respective component units 3 to 12 except for the body unit 51 and the additional component units 52 from the HUB 27 of the body unit 51.

Thus, the CPU 57 drives and controls the electronic parts 43 of the component units 3 to 12 except for the body unit 51 and the additional component units 52 based on the corresponding control signals S2. Therefore, the respective component units 3 to 12 except for the body unit 51 and the additional component units 52 can perform respective required actions for moving the robot 1 forward.

(2-2) Operation and Effects According to Second Embodiment

According to the robot 50 with the aforementioned construction, the CPU 57 in the control unit 53 changes the configuration information to changed configuration information according to the configuration of the robot 50 after connecting the additional component units 52 to the body unit 51, based on the configuration information and positional information read from the memory of the body unit 51 and the unit information read from the memory 56 of the additional component units 52 connected to the body unit 51.

Further, in the robot 50, the CPU 57 drives and controls the electronic parts 43 of the component units 3 to 12 except for the body unit 51 and the additional component units 52 based on the basic operation program and the configuration information, so that the robot 50 whose configuration is changed operates depending on instructions supplied from the host program of the basic operation program.

In this case, in the robot 50, since the basic operation program is previously stored in the memory 54 of the body unit 51, the control unit 53 can be simply exchanged for a new control unit without downloading the basic operation program to a memory 33 at the time of changing the control unit 53.

Further, in this robot 50, even when the additional component units 52 are connected to the body unit 51 to change the configuration of the robot 50, it is not necessary to download a basic operation program according to a new configuration of the robot 50 to the memory 33 of the control unit 53, so that the configuration of the robot 50 can be changed with ease.

As a result, in the robot 50, one control unit 53 can readily cope with the change of configuration of the robot 50 and can also be simply applied to other robots regardless of the configurations of the robots. Therefore, the generalization of the control unit 53 can be more improved than that of the robot 1 (FIG. 2) according to the aforementioned first embodiment.

According to the aforementioned construction, the configuration information and the basic operation program are stored in the memory 54 of the body unit 51 and the configuration information and the basic operation program are read out from the memory 54 in the body unit 51 by the control unit 53 detachably mounted in the first slot of the body unit 51 so that the robot 50 is operated based on the read configuration information and basic operation program and thereby, the control unit 53 can be readily exchanged.

Thus, a robot capable of simply improving its functions and performance can be realized.

Furthermore, even when the additional component units 52 are connected to the body unit 51 so that the configuration of the robot 50 is changed, the configuration information is changed in accordance with this change. Therefore, the configuration of the robot 50 can be simply changed and a robot capable of simply improve its function and performance can be realized.

(3) Other Embodiments

According to the aforementioned first and second embodiments, the present invention is applied to the four-foot walking type robot 1, 50. However, the present invention is not limited thereto but can be applied to robots with other kinds of configurations such as a two-foot walking type, a vehicle type, a two-wheeled driving type or modified types of them.

Figure 11:
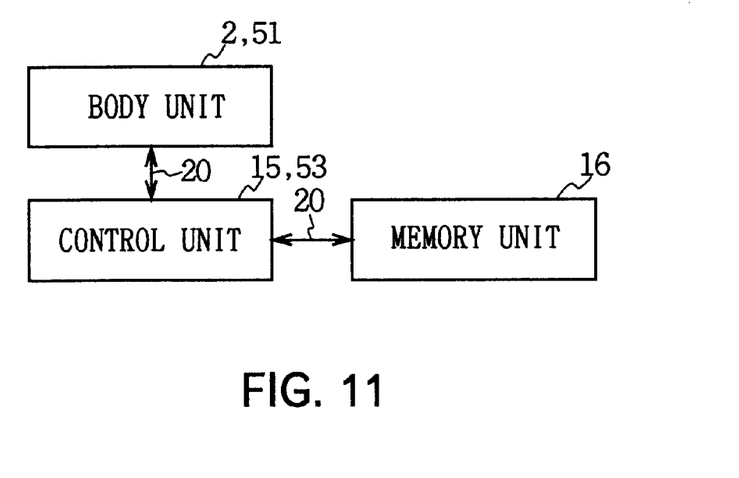
FIG. 11 is a schematic block diagram explaining the connection between a control unit, a memory unit and a body unit according to other embodiments.

Further, according to the aforementioned first and second embodiments, the control unit 15, 53 and the memory unit 16 mounted in the first and second slots 2A and 2B of the body unit 2, 51 are electrically connected together with the card bus 20 in the body unit 2, 51. However, the present invention is not limited thereto but the body unit 2, 51, the control unit 15, 53 and the memory part 16 can be connected in series as shown in FIG. 11.

Figure 12:
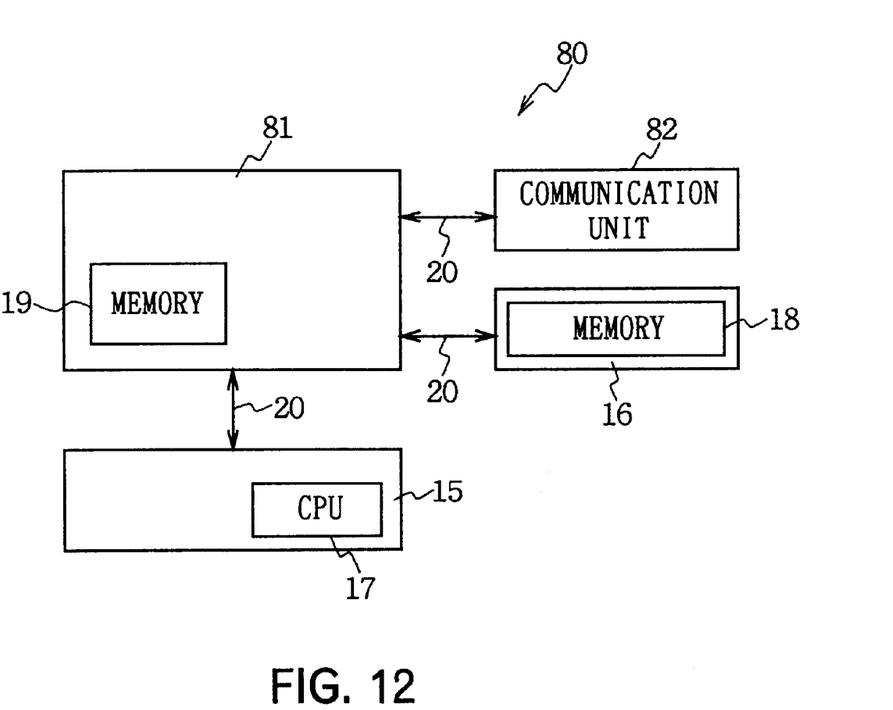
FIG. 12 is a block diagram showing the configuration of a robot according to other embodiments.

Further, according to the aforementioned first and second embodiments, the CPU 17, 57 operate the robot 1 in accordance with operation instructions supplied from the host program of the basic operation program. However, the present invention is not limited thereto but a third slot (not shown) can be provided on the body unit 81 of a robot 80 in addition to the first and second slots as shown in FIG. 12 in which the same reference numerals are applied to parts corresponding to FIG. 3, a communication unit 82 which is composed of a PC card and which contains a radio local area network (LAN) can detachably be mounted in the third slot in order to electrically connect the communication unit 82 to the control unit 15 with the card bus 20, so that the CPU 17 can operate the robot 80 based on operation instructions obtained from the outside via the communication unit 82. Furthermore, the robot can be operated based on operation instructions obtained from the outside using other various media, such as the case where the CPU 17, 57 can operate the robot based on operation instructions obtained from the outside with ethernet or the like.

Further, according to the aforementioned first and second embodiments, the control unit 15, 53, the memory unit 16 and the body unit 2, 51 are electrically connected together with the card bus 20. However, the present invention is not limited thereto but the control unit 15, 53, the memory unit 16 and the body unit 2, 51 can be electrically connected together with buses having other various types structures in place of the card bus 20.

Further, according to the aforementioned first embodiment, the basic operation program and the configuration information are previously stored in the memory 19 in the body unit 2. However, the present invention is not limited thereto but the operation program having a hierarchical structure comprising the host operation program and the subordinate operation program can be previously stored in the memory 19 in the body unit 2 and the robot 1 can be actuated by the CPU 17 only based on the operation program without employing the configuration information.

Further, according to the aforementioned first and second embodiments, the basic operation program having a hierarchical structure comprising the host operation program and the intermediate operation program is previously stored in the memory 19, 54 in the body unit 2, 51. However, the present invention is not limited thereto but the intermediate operation program of the basic operation program can be previously stored in the memory 19, 54 in the body unit 2, 51, and the host operation program of the basic operation program can be previously stored in the memory 18 in the memory unit 16.

Further, according to the aforementioned first and second embodiments, the basic operation program is previously stored in the memory 19, 54 in the body unit 2, 51. However, the present invention is not limited thereto but the basic operation program stored in the memory 19, 54 in the body unit 2, 51 can be rewritten as required.

Further, according to the aforementioned first and second embodiments, the robot 1 is operated by the CPU 17, 57 of the control unit 15, 53 based on the basic operation program and the configuration information. However, the present invention is not limited thereto but the control unit can be provided with a learning function for learning operations as the robot repeats a variety of operations and the basic operation program and the configuration information can be rewritten based on the learning result. Besides, the basic operation program and/or the configuration information, which is rewritten based on the learning result, can be mated with the basic operation program and/or the configuration information similarly rewritten based on the learning result of a robot having the same configuration or a different configuration, by using a genetic algorithm.

Further, according to the aforementioned first and second embodiments, the memory 19, 54 previously storing the basic operation program and the configuration information is accommodated in the body unit 2, 51. However, the present invention is not limited thereto but the memory 19, 54 can be accommodated in any of the component units 3 to 12 except for the body unit 2, 51 or the additional component units 52, or a memory in which only the basic operation program is previously stored and a memory in which the configuration information is previously stored can be accommodated in respectively different any of the component units 2 to 12 or in the additional component units 52, as long as the memory 19, 54 in which the basic operation program and the configuration are previously stored can electrically connected to the control unit 15, 53.

Further, according to the aforementioned first and second embodiments, the memory unit 16 containing a memory in which behavior type information is stored is mounted in the second slot 2B of the body unit 2, 51. However, the present invention is not limited thereto but and a memory unit containing an extending memory can be mounted in the second slot 2B of the body unit 2, 51 in place of the memory unit 16 and various kinds of information can be stored in the extending memory of the memory unit as desired.

Further, according to the aforementioned second embodiment, plural connection parts 51A are provided on the body unit 51. However, the present invention is not limited thereto but connection parts can be provided not only on the body unit 51 but also on the component units 3 to 12 except for the body unit 51 to connect the additional component units 52 thereto.

Further, according to the aforementioned second embodiments, the basic operation program is previously stored in the memory 54 in the body unit 51. However, the present invention is not limited thereto but plural basic operation programs according to various configurations of the robot 50 can be previously stored in the memory of the memory unit 16, so that a basic operation program according to configuration information changed depending on the connection of the additional component unit 52 to the body unit 51 is selected from these basic operation programs to be used.

Further, according to the aforementioned first and second embodiments, the control unit 15, 53 is used, which is monolithically and detachably held in a prescribed component unit as control means for driving and controlling the component units in respective prescribed states. However, the present invention is not limited thereto but other control means having various types of formations or configurations can be used as long as it can detachably held in a prescribed component unit.

Furthermore, according to the aforementioned first and second embodiments, the memory unit 16 is applied, which is monolithically and detachably mounted in a prescribed component unit as storing means for storing desired behavior type information stored. However, the present invention is not limited thereto but storing means having various kinds of formations or configurations can be used as long as it can detachably amounted in a prescribed component unit.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot device comprised of:
   plural component units connected together, and
   a controller having a memory wherein an operational system program is stored and detachably mounted on one of said component units, for driving and controlling each of said connected component units in a prescribed state.

2. The robot device according to claim 1, further comprising storing means detachably mounted on said one of said component units for storing desired behavior type information, wherein:
   said behavior type information is read out from said storing means; and
   each of said component units is driven and controlled in accordance with said read-out behavior type information.

3. The robot device according to claim 2, wherein said storing means is a memory card.

4. A robot device, comprising:
   plural component units connected together, and
   a controller detachably mounted on one of said component units, for driving and controlling each of said connected component units in a prescribed state,
   wherein each of said plural component units has unit information stored therein, and further comprising:
      first storing means which is held in said one of said component units for storing configuration information which represents a configuration of said robot; and
      second storing means for storing a prescribed operation program, wherein:
         said stored configuration information and operation program are read out from said first and second storing means respectively; and
         each of said component units is driven and controlled in a prescribed state in accordance with the read-out configuration information and operation program.

5. The robot device according to claim 4, wherein said configuration information is formed with a tree structure representing the connection condition of said component units.

6. A robot driving control method for driving and controlling a robot formed of plural component units connected together, comprising the steps of:
   detachably mounting a controller having a memory wherein an operational program is stored on one of said component units; and
   driving and controlling each of said component units in a prescribed state by said controller.

7. The robot driving control method according to claim 6, further comprising the steps of:
   storing desired behavior type information in storing means detachably mounted on said one of said component units;
   reading out said behavior type information from said storing means; and
   driving and controlling each of said component units in accordance with said read out behavior type information.

8. A robot driving control method for driving and controlling a robot formed of plural component units connected together, comprising the steps of:
   detachably mounting a controller on one of said component units; and
   driving and controlling each of said component units in a prescribed state by said controller, further comprising the steps of:
      providing storing means positioned in said one of said component units;
      storing configuration information representing a configuration of said robot in accordance with unit information stored in each of said component units;
      storing a prescribed operation program;
      reading out said stored configuration information and said stored operation program; and
      driving and controlling each of said component units in a prescribed state in accordance with said read out configuration information and operation program.

9. A robot device comprising plural component units connected together, a first storing device detachably mounted on one of said plural component units for storing desired behavior type information of said robot device and a controller having a second storing device wherein an operational program is stored.

10. A robot device formed of plural component units together, comprising:
    first storing means for storing configuration information which represent a configuration of said robot, formed in accordance with unit information stored in each of said component units;
    second storing means for storing a prescribed operation program;
    at least one additional component unit connectable to at least one of said connected plural component units; and
    control means for reading out said configuration information and said operation program from said first and second storing means respectively, for changing said read out configuration information in accordance with said at least one additional component unit, and for driving and controlling each of said connected plural component units and said at least one additional component unit in accordance with said changed configuration information and said read out operation program.

11. The robot device according to claim 10, wherein said configuration information is formed with a tree structure representing a connecting condition of said component units.

12. The robot device according to claim 10, wherein said control means is detachably mounted on at least one of said plural component units.

13. The robot device according to claim 10, further comprising third storing means, detachably mounted on one of said plurality of connected component units, for storing desired behavior type information, and wherein said control means reads out said behavior type information from said third storing means and drives and controls each of said component units in a prescribed state in accordance with said read out behavior type information, said changed configuration information and said operation program.

14. A robot driving control method for driving and controlling a robot formed of plural component units connected together, comprising the steps of:

storing, in storage means coupled with one of said connected plural component units, configuration information which represents a configuration of said robot, said configuration information being formed in accordance with comprising unit information stored in each of said component units;

storing a prescribed operation program in said storage means;

reading out said configuration information and said operation program from said storage means;

changing said read out configuration information in accordance with information stored in at least one predetermined component unit; and driving and controlling each of said component units in accordance with said changed configuration information and said read out operation program.

15. A robot comprising:

a body unit;

a plural component units connected to said body unit;

a memory mounted on said body unit for storing unit information of each of the component units;

a control unit mounted on said body unit for controlling the action of said robot;

a memory unit detachably mounted on said body unit for storing application program of said robot and a basic operation program;

wherein, said control unit reads out (i) said unit information, (ii) said basic operation program and (iii) said application program, and controls said component units in accordance with the read unit information, basic program, and application program.

16. The robot according to claim 15, wherein said unit information includes information pertaining to a role of each of said component units as a part of said robot.

17. The robot according to claim 15, wherein said unit information includes information pertaining to a formation of said component units.

18. The robot according to claim 15, wherein said unit information includes a position of the center of gravity of said component units.

19. The robot according to claim 15, wherein said control unit is detachably mounted on said body unit.

* * * * *